United States Patent
Palmiscno

(10) Patent No.: US 10,345,124 B2
(45) Date of Patent: Jul. 9, 2019

(54) ADAPTER FOR INSERTING WAFER RING BETWEEN FLANGES OF PROCESS PIPING

(71) Applicant: Dieterich Standard, Inc., Boulder, CO (US)

(72) Inventor: Kyle Joseph Palmiscno, Greeley, CO (US)

(73) Assignee: DIETERICH STANDARD, INC., Boulder, CO (US)

( * ) Notice: Subject to any disclaimer, the term of this patent is extended or adjusted under 35 U.S.C. 154(b) by 814 days.

(21) Appl. No.: 14/227,535

(22) Filed: Mar. 27, 2014

(65) Prior Publication Data
US 2015/0276437 A1    Oct. 1, 2015

(51) Int. Cl.
*G01L 1/00* (2006.01)
*G01D 11/30* (2006.01)
(Continued)

(52) U.S. Cl.
CPC ........... *G01D 11/30* (2013.01); *G01F 15/185* (2013.01); *F16L 23/006* (2013.01); *G01F 1/42* (2013.01); *G01F 1/46* (2013.01)

(58) Field of Classification Search
CPC ......... F16L 23/02; F16L 23/006; F16L 23/20; F16L 19/0231; G01L 9/00; G01L 19/0007;
(Continued)

(56) References Cited

U.S. PATENT DOCUMENTS

| 4,393,722 A | 7/1983 | Scott |
| 6,301,969 B1 * | 10/2001 | Hess ..................... G01F 1/38 73/756 |

(Continued)

FOREIGN PATENT DOCUMENTS

| CN | 2233563 | 8/1996 |
| CN | 2369218 | 3/2000 |

(Continued)

OTHER PUBLICATIONS

"Explore the World of Piping, Definition and Details of Flanges—Flange Faces—"; http://www.wermac.org/flanges/flanges_general_part5.html; Werner Solken 2008-2013; Nov. 6, 2013; 4 total pages.
(Continued)

*Primary Examiner* — Harshad R Patel
*Assistant Examiner* — Brandi N Hopkins
(74) *Attorney, Agent, or Firm* — Westman, Champlin & Koehler, P.A.

(57) ABSTRACT

An industrial process assembly for carrying a process fluid conveyed through process piping includes a wafer having a sealing surface of a first type and a fitting having a sealing surface of a second type, different from the first type. The wafer includes a bore for carrying the process fluid and the fitting is attached to process piping. An adapter has a first sealing surface for mating with the sealing surface of the wafer and a second sealing surface for mating with the sealing surface of the fitting. The adapter is positioned between the wafer and the fitting. The adapter further includes an inner bore having a same diameter as the bore of the wafer in some embodiments. An additional adapter is provided on a second side of the wafer in some embodiments.

8 Claims, 6 Drawing Sheets

(51) Int. Cl.
*G01F 15/18* (2006.01)
*G01F 1/42* (2006.01)
*G01F 1/46* (2006.01)
*F16L 23/00* (2006.01)

(58) Field of Classification Search
CPC ....... G01L 19/0015; G01L 19/00; G01F 1/36; G01F 15/185; G01F 1/42; G01F 1/46; G01F 1/38; G01F 1/40; G01F 1/34; G01F 15/00; G01F 15/18; F15D 1/025; G05D 7/0635; G01D 11/30; A61H 33/60; A61H 33/02
USPC ............. 73/714, 706, 861.61, 861.66, 865.5, 73/861.41, 861.52, 756; 137/385, 594, 137/597, 112, 340, 356; 285/32, 354
See application file for complete search history.

(56) References Cited

U.S. PATENT DOCUMENTS

| | | | |
|---|---|---|---|
| 6,311,568 B1 | 11/2001 | Kleven | |
| 7,004,036 B2* | 2/2006 | Gimson | G01F 1/6842 73/861.22 |
| 7,284,450 B2 | 10/2007 | Orleskie et al. | |
| 7,406,880 B2 | 8/2008 | Orleskie et al. | |
| 8,215,613 B2 | 7/2012 | Cheung | |
| 2002/0125716 A1 | 9/2002 | Rochelle | |
| 2003/0188586 A1 | 10/2003 | Orleskie et al. | |
| 2006/0070437 A1 | 4/2006 | Diederichs | |
| 2006/0220324 A1* | 10/2006 | Anderson | F16J 15/064 277/606 |
| 2009/0243290 A1 | 10/2009 | Anderson et al. | |
| 2011/0315905 A1 | 12/2011 | Hirose et al. | |

FOREIGN PATENT DOCUMENTS

| | | |
|---|---|---|
| CN | 101124426 | 2/2008 |
| CN | 201034650 Y | 3/2008 |
| CN | 103591992 | 2/2014 |
| DE | 35 41 436 | 7/1987 |
| EP | 1 050 752 | 11/2000 |
| GB | 2 278 201 | 11/1991 |
| JP | S5569019 A | 5/1980 |
| JP | 2003-509675 | 3/2003 |
| JP | 2005522686 A | 7/2005 |
| JP | 2005-207526 | 8/2005 |
| JP | 2008-514957 | 5/2008 |
| JP | 2012082891 | 4/2012 |

OTHER PUBLICATIONS

"Uni-Flange Adapter, Simple & Effective Flange Adapters"; VALVECO; 2/10; HMA; 8 pages.

Notification of Transmittal of the International Search Report and the Written Opinion of the International Searching Authority, from PCT/US2015/020118, dated Jun. 9, 2015.

Office Action from Chinese Patent Application No. 201410573528.8, dated Jan. 26, 2017.

Communication from European Patent Application No. 15711630.2, dated Dec. 6, 2016.

Rejection Notice from Japanese Patent Application No. 2016-558668, dated Dec. 20, 2017, 15 pages.

Office Action from Japanese Patent Application No. 2016-558668, dated Aug. 2, 2017.

Second Office Action from Chinese Patent Application No. 201410573528.8, dated Sep. 18, 2017, 18 pages.

Rejection Notice from Chinese Patent Application No. 201410573528.8, dated Sep. 4, 2018.

* cited by examiner

ADAPTER FOR INSERTING WAFER RING BETWEEN FLANGES OF PROCESS PIPING

BACKGROUND

The present disclosure relates to process control systems. In particular, the present disclosure relates to wafer rings and flanges in industrial processes.

In processing plants, fluids are conveyed through piping to various processing elements. The piping includes individual pipe sections that are connected together by fittings. Elements, such as sensors and valves, can be introduced into the piping by placing the elements between the fittings of two pipe sections.

In a common configuration, a wafer ring is placed between two pipe sections. The wafer ring includes an outer ring that is positioned annularly about at least one fluid flow passage. One or more holes pass through the outer ring in a radial direction. Sensors may be introduced through the radial holes to interact with the fluid and/or piping may be introduced into the radial holes to direct fluid to a sensor mounted outside of the piping. Further, orifice plates, averaging pitot tubes, other flow obstructions or other components that interact with the process fluid may be positioned within the fluid flow passage of the wafer ring.

Some wafer rings are installed between process pipes by sandwiching the wafer ring between two flange fittings that are then connected together by nuts and studs. Flange fittings generally include a collar that is welded to the end of a pipe, a bore that is aligned with the inner bore of the pipe, an annular sealing section that extends around the bore and a flange section that extends around the annular sealing section. The flange section includes a planar face that has several through holes that accept studs for connecting the fitting to another fitting. The annular sealing section has a sealing face designed to mate with and seal against one or more other elements at the fitting junction.

There are a number of different types of sealing faces including flat, raised, ring-type joint (RTJ), tongue-and-groove, and male-and-female.

A flat sealing face is co-planar with the face of the flange section resulting in a large mating area when the flange fitting is sealed against another flange fitting. A raised sealing face is raised relative to the face of the flange section resulting in a smaller sealing surface but a greater sealing pressure. An RTJ sealing face is a raised face that includes an annular channel that is designed to accept a metallic sealing ring. The metallic sealing ring is compressed as the flange fittings are bolted together causing the ring to come into intimate contact with the surface of the annular channel and thereby form a metallic seal with the channel. A tongue-and-groove sealing face includes one of either a tongue or a grove and is designed to be mated with an opposing sealing surface that contains the other of a tongue or groove. A male-and-female sealing surface includes one of either an inner annular ring or an outer annular ring and is designed to be mated with an opposing sealing surface that contains the other of an inner annular ring or an outer annular ring.

SUMMARY

An industrial process assembly for carrying a process fluid conveyed through process piping includes a wafer having a sealing surface of a first type and a fitting having a sealing surface of a second type, different from the first type. The wafer includes a bore for carrying the process fluid and the fitting is attached to process piping. An adapter has a first sealing surface for mating with the sealing surface of the wafer and a second sealing surface for mating with the sealing surface of the fitting. The adapter is positioned between the wafer and the fitting.

A wafer-to-fitting sealing adapter for conveying a process fluid includes an inner bore having a same diameter as an inner bore of a wafer used to convey a process fluid, a first sealing face, and a second sealing face opposite the first sealing face. The second sealing face has a planar region and an integral annular protrusion extending away from the planar region and having a same diameter as an annular channel on a fitting.

A wafer assembly for insertion in process piping conveying a process fluid includes a wafer ring, a first sealing adapter and a second sealing adapter. The wafer ring has a first annular planar sealing surface on a first side, a second annular planar sealing surface on a second side opposite the first side, and a bore for conveying process fluid. The first sealing adapter has a planar sealing surface on a first side facing the first side of the wafer ring and a non-planar sealing surface on a second side. The second sealing adapter has a planar sealing surface on a first side facing the second side of the wafer ring and a non-planar sealing surface on a second side.

DETAILED DESCRIPTION OF ILLUSTRATIVE EMBODIMENTS

Wafers are currently designed so that their sealing surfaces will mate with raised face ANSI flanges. They are not currently designed for installation between ring type joint (RTJ) flanges or other types of flanges. Some of the embodiments described below provide adapters that allow wafers with sealing surfaces designed to mate with raised face ANSI flanges to be installed between ring type joint flanges or other types of flanges. The adapters provide for such additional installations without requiring that the wafer width be increased to accommodate a machined gasket groove and without requiring multiple different wafer designs for each line size. Thus the adapters do not require an increase in the inventory requirements for wafers themselves. Further, the adapters do not require modification of the wafers when the wafers are installed between other types of flanges.

Figure 1:
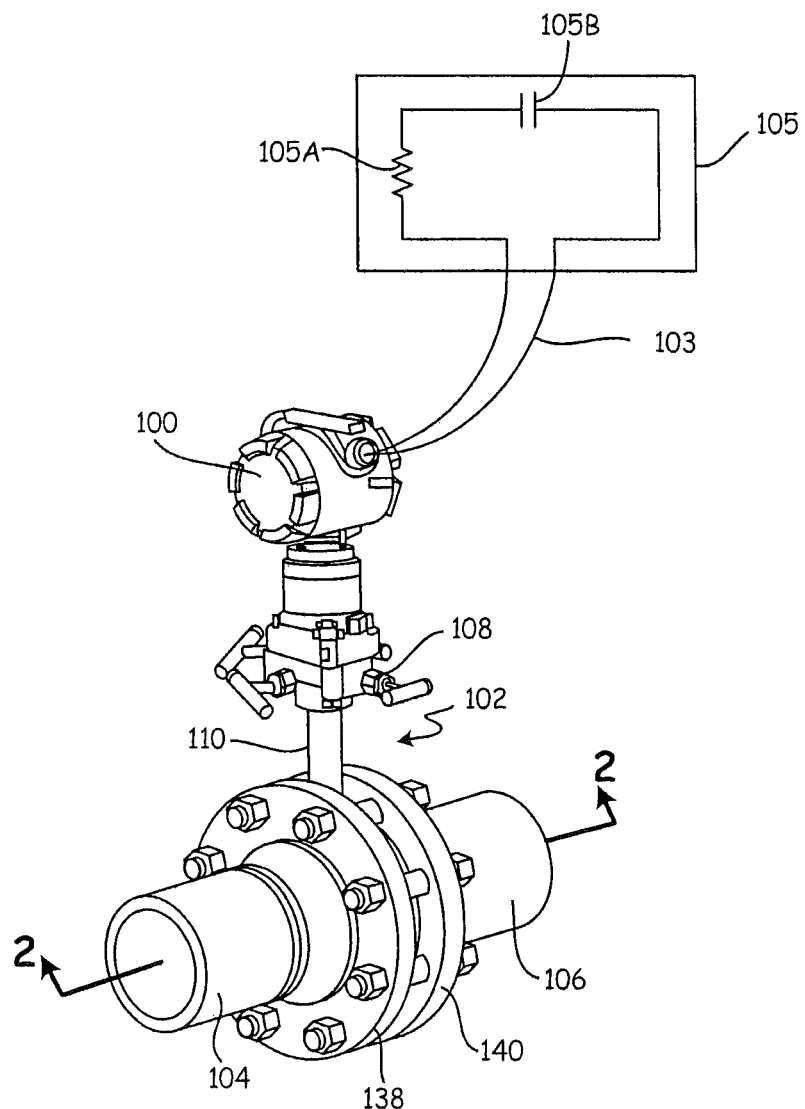
FIG. 1 is a simplified diagram of an industrial process control system.
Figure 2:
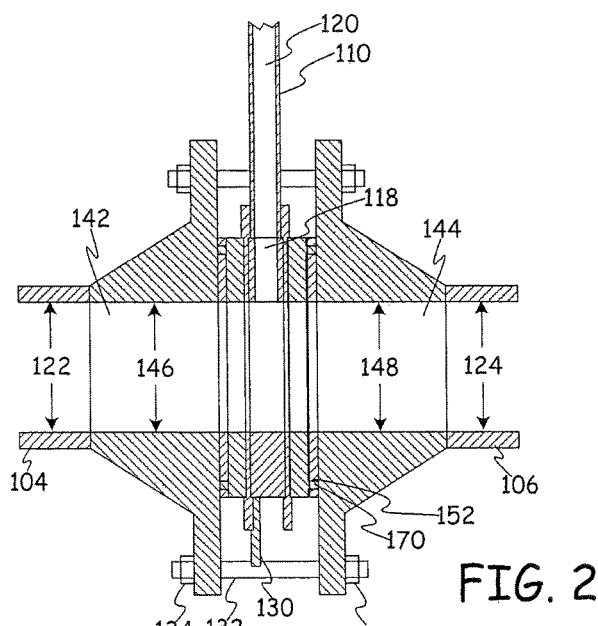
FIG. 2 is a cross-sectional side view of a portion of the system of FIG. 1.
Figure 4:
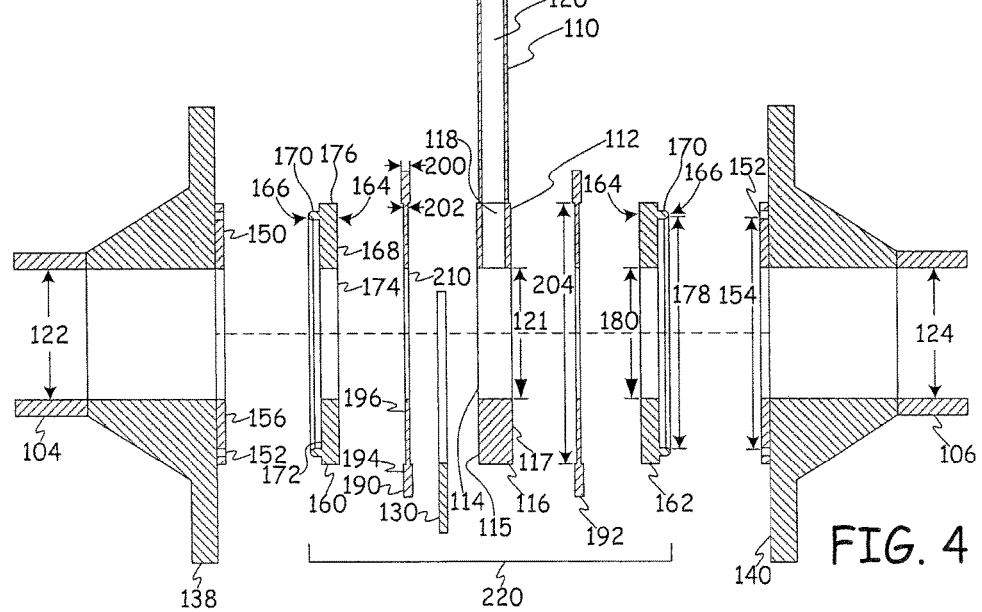
FIG. 4 is an exploded cross-sectional side view of a portion of the system of FIG. 1.
Figure 3:
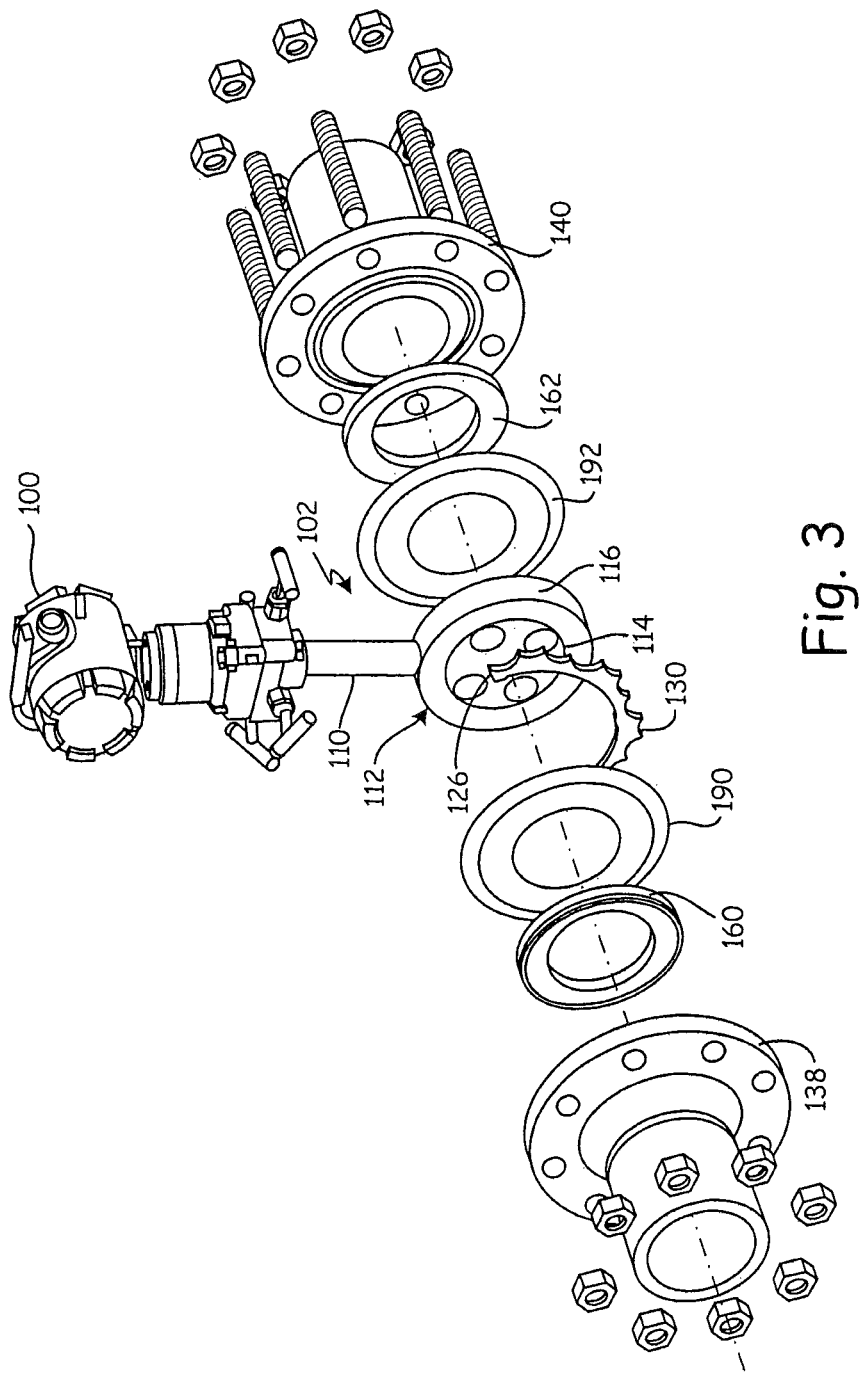
FIG. 3 is an exploded perspective view of the system of FIG. 1.

FIG. 1 is a perspective view of a portion of a process control system and FIGS. 2, 3 and 4 provide a cross-sectional side view, an exploded perspective view and an exploded cross-sectional side view, respectively, of an industrial process assembly of FIG. 1, which includes an embodiment of the present invention. In FIGS. 1-4 a process variable transmitter 100 is mounted to a wafer 102 that is installed between two pipe sections 104 and 106. Process variable transmitter 100 communicates with a control room 105 to provide one or more process variables. Example process variables include pressure, temperature, flow level, pH conductivity, turbidity, density, concentration, chemical composition, etc. Process variable transmitter 100 may communicate with control room 105, illustrated as a resistance 105A and a power supply 105B, using various techniques including both wired and wireless communication. One common wired communication technique uses what is known as a two-wire process control loop 103 in which a single pair of wires is used to carry information as well as provide power to transmitter 100. One technique for transmitting information is by controlling the current level through process control loop 103 between 4 milliamps and 20 milliamps. The value of the current within the 4-20 milliamp range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART® in accordance with IEC 62591, may also be implemented.

Transmitter 100 is mounted on a mounting plate 108 of wafer 102. Wafer 102 also includes a hollow post 110 and a wafer ring 112. Wafer ring 112 has an inner bore 114 and an outer diameter 116. A radially extending hole 118 extends from inner bore 114 to a conduit 120 within post 110. Radially extending hole 118 and conduit 120 may be further subdivided to form multiple separate passageways from inner bore 114 to mounting plate 108. One or more of these passageways may act as a fluid conduit for conveying fluid from inner bore 114 to mounting plate 108 and then to transmitter 100. In accordance with some embodiments, two fluid channels are provided to allow for differential pressure sensing. Additional radially extending holes may be provided in wafer ring 112 for inserting additional measurement devices such as a temperature sensor.

Wafer ring 112 has two opposing sides each with a respective annular planar sealing surface 115, 117 that extends from inner bore 114 to outer diameter 116. Thus, both sides of wafer ring 112 provide a first type of sealing surface in the embodiment of FIGS. 1-4.

Inner bore 114 has a diameter 121 (FIG. 4) that in accordance with many implementations is the same as an inner bore diameter 122 and an inner bore diameter 124 of pipes 104 and 106, respectively. As shown in FIG. 3, a flow obstruction 126 may be included in inner bore 114. Such obstructions may include a conditioning orifice plate, a compact orifice plate, or an averaging pitot tube such as an Annubar®, for example. In FIGS. 2 and 4, the obstructing element is not shown.

An alignment ring 130 is placed around outer circumference 116 of wafer ring 112 and engages one or more studs such as stud 132 (FIG. 2) that together with nuts, such as nuts 134 and 136, connect fittings 138 and 140 together. Fittings 138 and 140 are flange type fittings that are welded to pipes 104 and 106, respectively. Alignment ring 130 is a partial annular ring that extends angularly more than 180° such that when it is inserted about outer circumference 116, it engages outer circumference 116 along an inner circumference of alignment ring 130 and such that alignment ring 130 is prevented from moving in a radial direction relative to outer circumference 116.

Fittings 138 and 140 have respective inner bores 142 and 144 (FIG. 2) with inner diameters 146 and 148 that match inner diameters 122 and 124, respectively, of pipes 104 and 106. Each flange fitting 138, 140 has a sealing surface 150 that includes an annular channel 152 (FIG. 4). Annular channel 152 has a diameter 154 and is recessed relative to a planar portion 156 of the sealing surface 150. Note that in FIG. 4, fitting 138 and fitting 140 are identical and reference numbers provided for one of the fittings are applicable to the other of the fittings.

Sealing surface 150 is of a different type from annular planar sealing surfaces 115 and 117 of wafer ring 112. In particular, sealing surface 150 is a ring joint type sealing surface while planar surfaces 115 and 117 are designed to be mated with a raised face sealing surface. As such, if wafer ring 112 were mated to sealing surface 150 directly, fluid would leak between the fittings and the wafer ring. In the past, it has not been possible to use wafer ring 112 with any type of fitting other than a raised face fitting.

Under several embodiments, adapters are provided that allow a wafer ring having a sealing surface of a first type to be sealed between fittings having a sealing surface of a second type. In particular, as shown in FIG. 4, one embodiment provides for adapters 160 and 162 that allow a wafer ring 112 that has planar sealing surfaces 115 and 117 to be sealed between two fittings 138 and 140 having a ring joint type sealing surface 150. Adapters 160 and 162 are identical to each other in FIG. 4. As such, reference numbers applied to one of the adapters can also be applied to the other adapter.

Adapters 160 and 162 include a first side 164 and an opposite second side 166 with first side 164 facing wafer ring 112 and second side 166 facing sealing surface 150 of a fitting. First side 164 has a sealing face or sealing surface 168 for mating with a sealing surface of a first type and in particular a planar surface such as planar surface 115 and 117. Sealing surface 168 extends from an inner bore 174 to an outer circumference 176. In accordance with one embodiment, sealing surface 168 is machined to meet ASME B16.5 standards for a serrated sealing surface.

According to this embodiment, second side 166 has a non-planar sealing surface that includes a planar region 172 and an annular protrusion 170 that extends away from planar region 172 and is an integral part of the adapter 160, 162. Annular protrusion 170 has a diameter 178, which matches diameter 154 of annular channel 152 of sealing surface 150. In the embodiment of FIG. 4, annular protrusion 170 has a round top surface. As shown in FIG. 2, annular protrusion 170 is positioned within annular channel 152 and directly contacts annular channel 152. In other words, second side 166 of adapter 160, 162 mates directly to a ring type joint flange. Further, annular protrusion 170 is deformed by annular channel 152 as fittings 138 and 140 are brought toward each other using the studs and nuts connecting fittings 138 and 140 such as stud 132 and nuts 134 and 136.

The deformation of annular protrusion 170 creates intimate contact between the protrusion and the channel thereby creating a metal seal. In accordance with some embodiments, second side 166 is machined to meet the geometric requirements laid out in ASME B16.20.

In accordance with some embodiments, adapters 160 and 162 are formed of a single piece of material and can be formed, for example, by machining bar stock.

Inner bore 174 has a diameter 180 that in accordance with one embodiment is the same as diameter 121 of inner bore 114 of wafer ring 112. Thus, adapters 160, 162 are machined such that the inside diameter of the adapters match that of the wafer for each specific line size. This creates a smooth transition between the adapter and wafer, eliminating the inconsistencies that an in-line step can create with a flow measurement. It also creates a uniform upstream and downstream transition between the adapter and the wafer. In accordance with some embodiments, diameter 180 is also the same as pipe diameter 124 and pipe diameter 122. When installing wafer ring 112 and adapters 160 and 162 between fittings 138 and 140, annular protrusion 170 is positioned within channel 152 so that bore 174 is aligned with bores 142 and 144 of fittings 138 and 140.

According to one embodiment, gaskets 190 and 192 are then positioned on adapters 160 and 162, respectively. Gaskets 190 and 192 are identical in the figures and reference numbers applied to one of the gaskets can also be applied to the other of the gaskets. Gaskets 190 and 192 include an annular seating portion 194 that is positioned annularly about an annular sealing portion 196. Annular seating portion 194 has a width 200 that is greater than a width 202 of annular sealing portion 196. The difference in widths causes the annular seating portion 194 to extend away from the annular sealing portion 196 on both sides of gaskets 190 and 192 at an annular junction between annular sealing portion 196 and annular seating portion 194. This annular junction has a diameter 204 that is equal to the diameter of outer circumference 176 of adapters 160 and 162 and the diameter of outer circumference 116 of wafer ring 112. As a result, gasket 190 is seated on adapter 160 with seating portion 194 extending around outer circumference 176 of adapter 160 and is seated on wafer ring 112 with seating portion 194 extending about circumference 116 of wafer ring 112. Similarly, gasket 192 is seated on adapter 162 such that seating portion 194 is positioned about outer circumference 176 and is seated on wafer ring 112 such that seating portion 194 is positioned about outer circumference 116.

Because of seating portion 194, gaskets 190 and 192 position wafer ring 112 relative to adapters 160 and 162 such that inner bore 114 is aligned with inner bore 174 of adapters 160 and 162. Furthermore, gaskets 190 and 192 include inner bores 210, which have the same inner diameter as bore 121 of wafer ring 112 and bore 174 of adapters 160 and 162. As a result, when assembled (FIG. 2), wafer ring 112, gaskets 190 and 192 and adapters 160 and 162 provide a uniform diameter bore between fittings 138 and 140. Although a uniform diameter bore is shown in FIG. 2, those skilled in the art will recognize that inner bore 114 of wafer ring 112 may be made smaller or larger than inner bores 142 and 144 of fittings 138 and 140 or may be made smaller than inner bores 142 and 144. Further, adapters 160 and 162 may provide step changes in the diameters or may provide smooth changes in the diameters from bores 142 and 144 of fittings 138 and 140 to bore 114 of wafer ring 112.

Together, adapters 160, 162, gaskets 190, 192, wafer 102 and alignment ring 130 form a wafer assembly 220. Note that in some embodiments, the wafer assembly does not include alignment ring 130.

Figure 5:
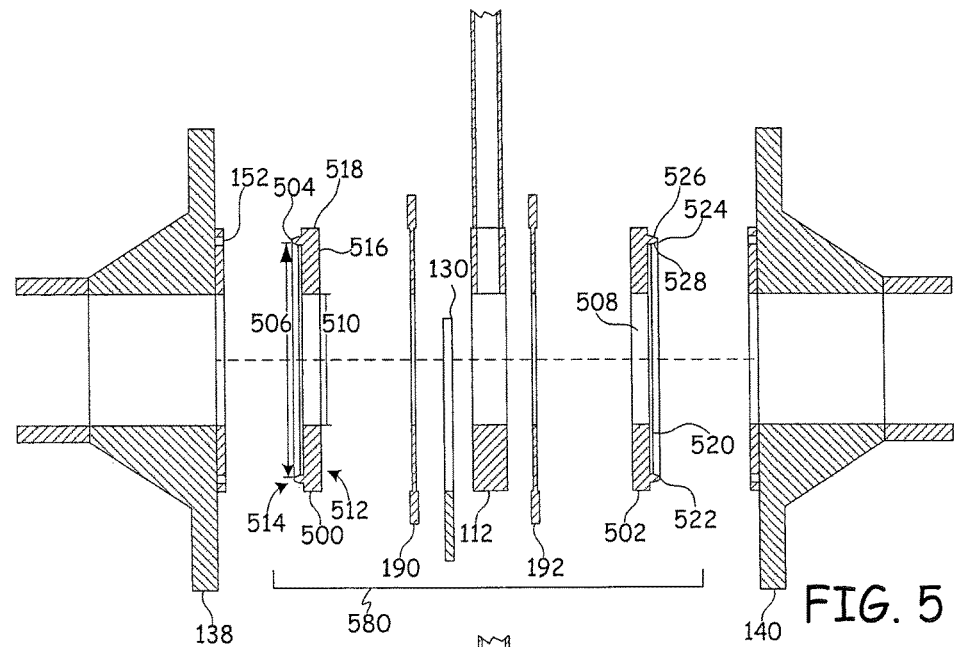
FIG. 5 is an exploded cross-sectional side view of an industrial process assembly of a second embodiment.

FIG. 5 provides an exploded cross-sectional side view of a second embodiment. In FIG. 5, fittings 138, 140, gaskets 190, 192, alignment ring 130 and wafer ring 112 are the same as described in FIGS. 1-4. In FIG. 5, two new adapters 500 and 502 are provided. Adapters 500 and 502 are identical to each other and reference numbers applied to one of them can be applied to the other. Adapters 500 and 502 differ from adapters 160 and 162 because the annular protrusion 522 on adapters 500 and 502 have angled sides and a flat top surface rather than the straight sides and rounded top surface of annular protrusion 170 of adapters 160 and 162.

Adapters 500 and 502 include first sides 512 and second sides 514 with first sides 512 having a planar sealing surface 516 extending from inner bore 508 to an outer circumference 518. Second sides 514 have a non-planar sealing surface that includes a planar region 520 and an annular protrusion 522. Annular protrusion 522 is raised away from planar region 520, has a diameter 506 that is the same as diameter 154 of annular channel 152. Annular protrusion 522 fits within annular channel 152 and is deformed by annular channel 152 so that it is in intimate contact with channel 152 to form a metallic seal. Annular protrusion 522 includes a top planar surface 524 that is parallel to planar region 520 on the sealing surface of second side 514. Annular protrusion 522 further includes a first angled planar surface 526 on an outer side of top planar surface 524 and a second angled surface 528 on an inner side of planar surface 524.

Together, adapters 500, 502, gaskets 190, 192, wafer 102 and alignment ring 130 form a wafer assembly 580. Note that in some embodiments, the wafer assembly does not include alignment ring 130.

Figure 6:
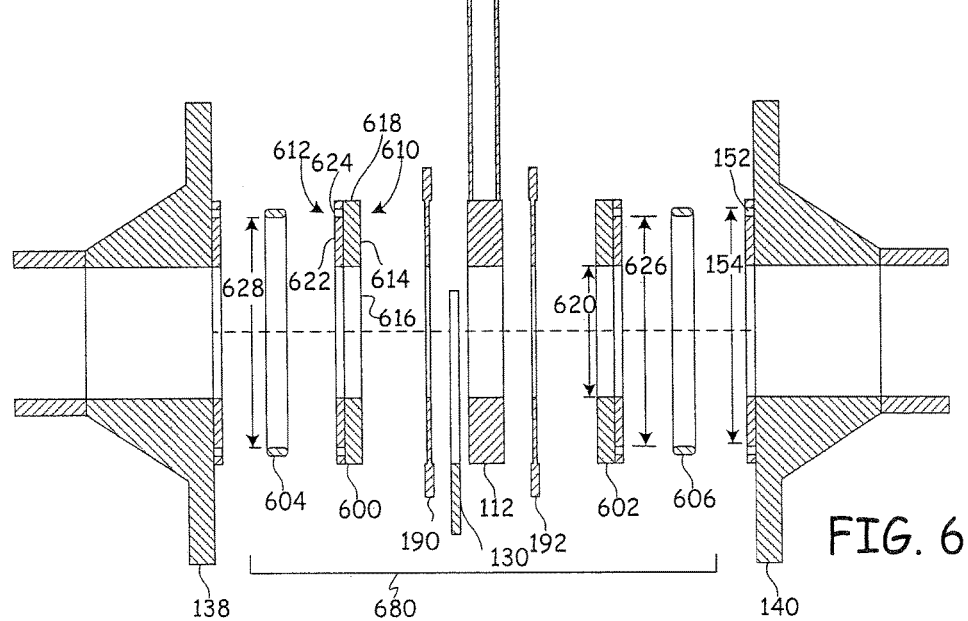
FIG. 6 is an exploded cross-sectional side view of an industrial process assembly of a third embodiment.

FIG. 6 provides a third embodiment in which fittings 138, 140, gaskets 190, 192, alignment ring 130 and wafer ring 112 are the same as described above for FIGS. 1-4. In FIG. 6, two new adapters 600 and 602 are provided along with two ring type joint gaskets 604 and 606. Adapters 600 and 602 are identical to each other and reference numbers applied to one can be applied to the other. Similarly ring type joint gaskets 604 and 606 are identical to each other and reference numbers applied to one can be applied to the other.

Adapters 600 and 602 include a first side 610 and a second side 612. First side 610 includes a planar sealing surface 614 that extends from an inner bore 616 to an outer circumference 618. Inner bore 616 has a diameter 620 that is the same as diameter 121 of bore 114 of wafer ring 112. Second side 612 includes a non-planar sealing surface formed by a planar surface 622 and an annular channel 624. Annular channel 624 has a diameter 626 that is the same as diameter 154 of channel 152 on fittings 138 and 140. Ring type joint gaskets 604 and 606 have diameters 628 that match diameters 626 and 154 such that ring type joint gaskets 604 and 606 fit within annular channels 152 and 624. When ring type joint gaskets 604 and 606 are positioned in annular channels 152 and 624 they are deformed by annular channels 152 and 624 to come into intimate contact with channels 152 and 624 to thereby form metallic seals between gaskets 604, 606 and fittings 138 and 140 as well as between gaskets 604, 606 and adapters 600 and 602.

Together, adapters 600, 602, ring type joint gaskets 604 and 606, gaskets 190, 192, wafer 102 and alignment ring 130 form a wafer assembly 680. Note that in some embodiments, the wafer assembly does not include alignment ring 130.

As shown above, in the embodiments of FIGS. 1-6, adapters are provided for allowing a wafer ring with two planar surfaces to be positioned between two fittings with ring type joint sealing surfaces. In the embodiments discussed below, adapters are provided that allow a wafer ring with two planar surfaces to be positioned between two fittings with different sealing surfaces.

Figure 7:
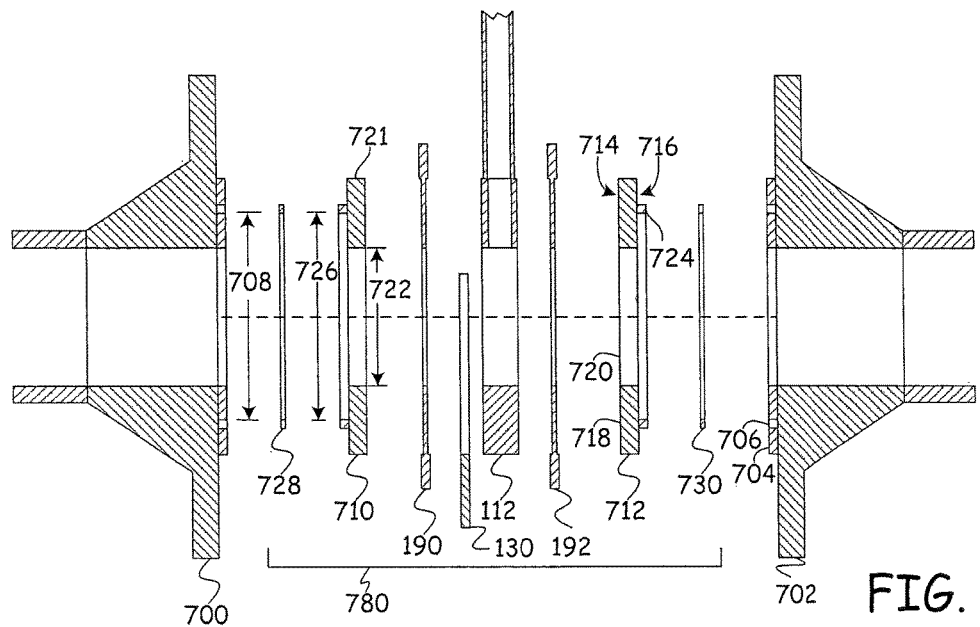
FIG. 7 is an exploded cross-sectional side view of an industrial process assembly of a fourth embodiment.

FIG. 7 provides a fourth embodiment in which a wafer ring 112 with planar sealing surfaces is installed between fittings 700 and 702 that have groove type sealing surfaces 704 that include a groove 706. In FIG. 7, wafer ring 112, alignment ring 130 and gaskets 190 and 192 are the same as described above. Fittings 700 and 702 are identical to each other and reference numbers applied to one may be applied to the other.

Groove 706 of groove sealing surface 704 is an annular groove with a diameter 708. Two adapters 710 and 712 are provided that have first sides 714 and second sides 716. Adapters 710 and 712 are identical and reference numbers applied to one may be applied to the other. On first side 714, adapters 710, 712 have a planar sealing surface 718 that extends from an inner bore 720 to an outer circumference 721. On second side 716, adapters 710 and 712 have non-planar sealing surfaces that include an annular protrusion 724, referred to as a tongue, with a diameter 726 that matches diameter 708 of groove 706. Annular protrusion 724 is sized and shaped to fit within groove 706. Two annular gaskets 728 and 730 are provided to be positioned in annular groove 706 between a top surface of protrusion 724 and a bottom surface of groove 706. Gasket 728 forms a seal between adapter 710 and fitting 700 and gasket 730 forms a seal between adapter 712 and fitting 702. Inner bore 720 of adapter 710 and 712 has a diameter 722 that is the same as the diameter 121 of wafer ring 112.

Together, adapters 710, 712, gaskets 728, 730, gaskets 190, 192, wafer 102 and alignment ring 130 form a wafer assembly 780. Note that in some embodiments, the wafer assembly does not include alignment ring 130.

Figure 8:
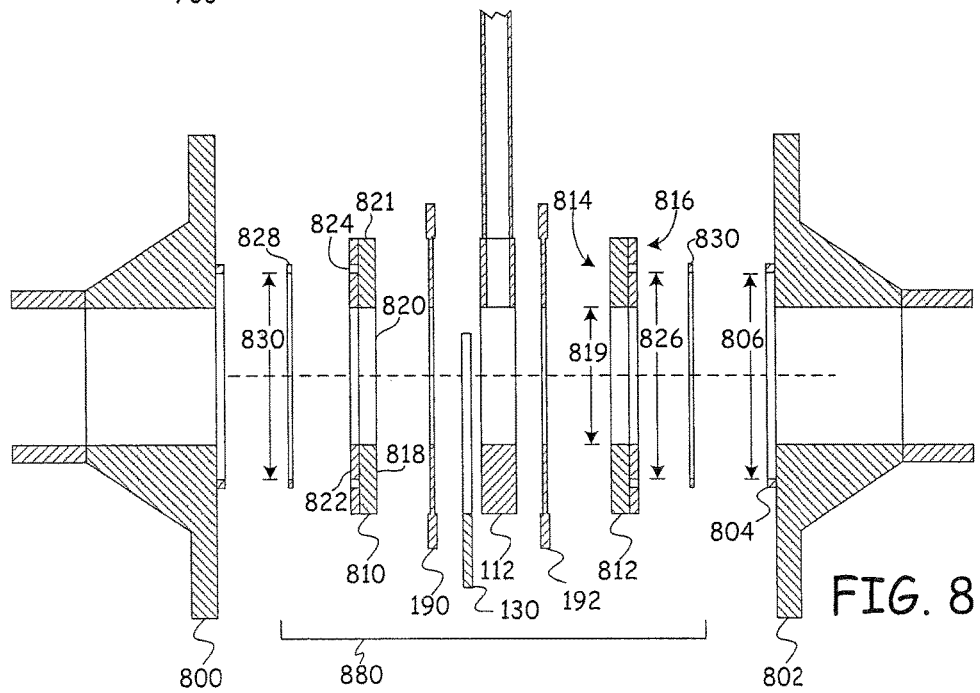
FIG. 8 is an exploded cross-sectional side view of an industrial process assembly of a fifth embodiment.

FIG. 8 provides an example of a fifth embodiment in which fittings 800 and 802 each include an annular protrusion 804, referred to as a tongue, having a diameter 806 and two adapters 810 and 812 are provided that each have an annular groove 824 with a diameter 826. In FIG. 8, fittings 800 and 802 are identical and references numbers applied to one may be applied to the other. Similarly, adapters 810 and 812 are identical and reference numbers applied to one may be applied to the other.

Adapters 810 and 812 each have a first side 814 and a second side 816. Side 814 includes an annular planar sealing surface 818 that extends from an inner bore 820 to an outer circumference 821. Second side 816 includes a non-planar sealing surface formed from a planar surface 822 and annular groove 824. Annular protrusion 804 is sized and shaped to fit within annular groove 824. Annular gaskets 828 and 830 are provided to be positioned in annular groove 824 between a top surface of annular protrusion 804 and a bottom surface of groove 824. Gasket 828 forms a seal between adapter 810 and fitting 800 and gasket 830 forms a seal between adapter 812 and fitting 802. Annular gasket 828 has a diameter 830, where diameters 830, 826 and 806 are all the same.

Inner bore 820 has a diameter 819 which is the same as diameter 121 of wafer ring 112. In FIG. 8, gaskets 190 and 192, alignment ring 130, and wafer ring 112 are the same as in FIGS. 1-7. In FIG. 8, adapters 810 and 812 allow a wafer ring with planar surfaces to be mounted between two fittings having a tongue sealing surface.

Together, adapters 810, 812, gaskets 828, 830, gaskets 190, 192, wafer 102 and alignment ring 130 form a wafer assembly 880. Note that in some embodiments, the wafer assembly does not include alignment ring 130.

Figure 9:
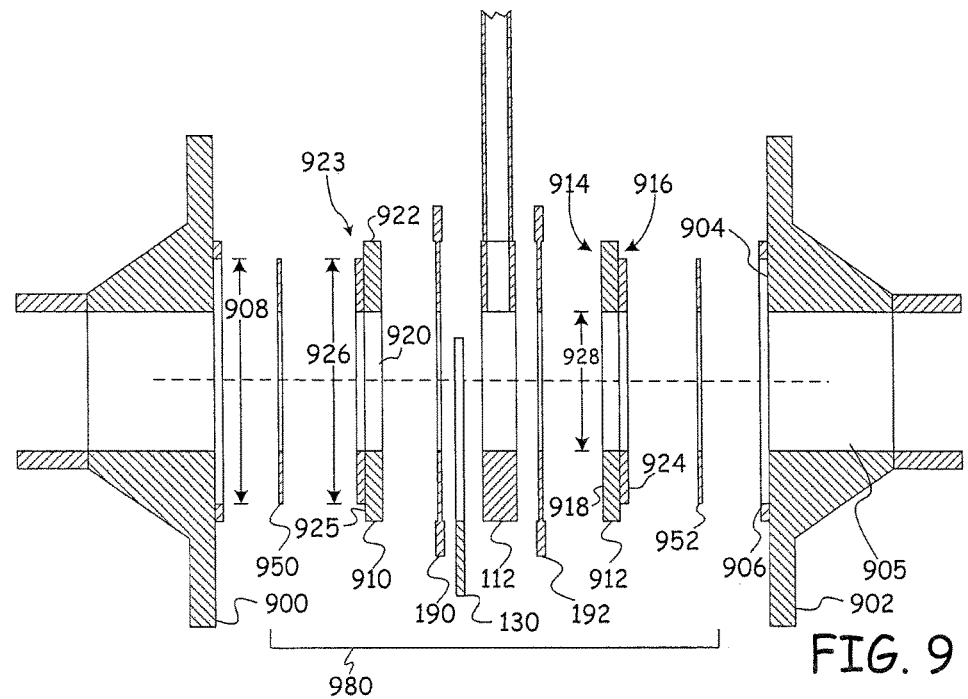
FIG. 9 is an exploded cross-sectional side view of an industrial process assembly of a sixth embodiment.

FIG. 9 provides an exploded side cross-sectional view of a sixth embodiment having female face fittings 900 and 902 and adapters 910 and 912. In FIG. 9, fittings 900 and 902 are identical and references numbers applied to one may be applied to the other. Similarly, adapters 910 and 912 are identical and reference numbers applied to one may be applied to the other. Wafer ring 112, alignment ring 130 and gaskets 190 and 192 are the same as described above in the preceding figures.

Female face fittings 900 and 902 include a planar sealing surface 904 defined between an inner bore 905 and an annular ring 906. Annular ring 906 has an inner diameter 908 and extends away from planar sealing surface 904. Two sealing adapters 910 and 912 are provided, each having a first side 914 and second side 916. First side 914 includes an annular planar sealing surface 918 that extends from an inner bore 920 to an outer circumference 922. Second side 916 includes a non-planar sealing surface 923 in the form of an annular ring 924 extending from bore 920 to an outer annular surface 925 that extends around annular ring 924. Annular ring 924 is raised relative to annular surface 925. Annular ring 924 has an outer diameter 926 that is equal to inner diameter 908 of ring 906 such that male annular ring 924 fits within annular ring 906 on fittings 900 and 902. Preferably, two annular gaskets 950 and 952 fit between a top surface of annular ring 924 and planar surface 904. Annular gasket 950 is positioned between adapter 910 and fitting 900 and annular gasket 952 is positioned between adapter 912 and fitting 902.

Inner bore 920 of adapters 910 and 912 has a diameter 928, which is equal to diameter 121 of the inner bore of wafer ring 112. In FIG. 9, adapters 910 and 912 allow a wafer ring 112 with planar sealing surfaces to be sealed between two fittings having a female sealing face.

Together, adapters 910, 912, gaskets 950, 952, gaskets 190, 192, wafer 102 and alignment ring 130 form a wafer assembly 980. Note that in some embodiments, the wafer assembly does not include alignment ring 130.

Figure 10:
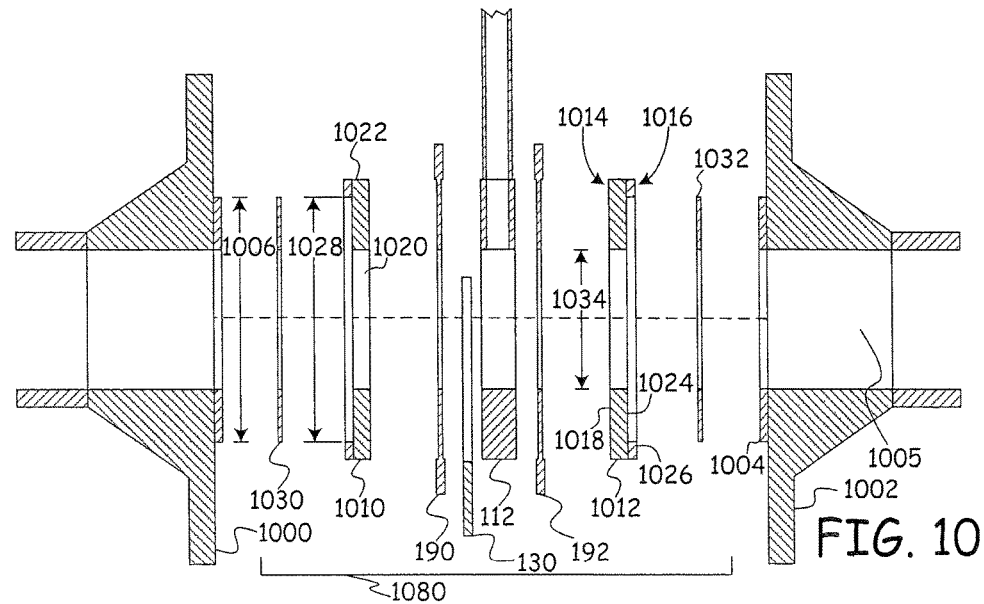
FIG. 10 is an exploded cross-sectional side view of an industrial process assembly of a seventh embodiment.

FIG. 10 provides an exploded side cross-sectional side view of a seventh embodiment. In FIG. 10, two male face fittings 1000, 1002 and two adapters 1010 and 1012 are provided. Fittings 1000 and 1002 are identical and references numbers applied to one may be applied to the other. Similarly, adapters 1010 and 1012 are identical and reference numbers applied to one may be applied to the other. Wafer ring 112, alignment ring 130 and gaskets 190 and 192 are the same as described above in the preceding figures.

Fittings 1000 and 1002 include a male sealing surface 1004 extending from an inner bore 1005 to an outer circumference having an outer diameter 1006. Male sealing surface 1004 is an annular planar sealing surface. Adapters 1010 and 1012 include a first side 1014 and a second side 1016. First side 1014 includes a planar annular sealing surface 1018 that extends from an inner bore 1020 to an outer circumference 1022. Second side 1016 includes a non-planar sealing surface defined by a planar surface 1024 that extends from inner bore 1020 to an annular ring 1026 that is raised above planar surface 1020. Annular ring 1026 has an inner diameter 1028 that is equal to outer diameter 1006 of male sealing surface 1004 such that male sealing surface 1004 fits within annular ring 1026. Annular gasket 1030 is positioned between planar surface 1024 of adapter 1010 and male sealing surface 1004 of fitting 1000. Similarly, annular gasket 1032 is positioned between planar surface 1024 of adapter 1012 and male sealing surface 1004 of fitting 1002.

Bore 1020 has an inner diameter 1034 that is the same as inner diameter 121 of wafer ring 112. Adapters 1010, 1012 allow wafer ring 112 to be sealed between male face fittings by providing a planar sealing surface designed to mate with the planar sealing surface of wafer ring 112 and a female sealing surface designed to mate with the male sealing surface of fittings 1000 and 1002.

Together, adapters 1010, 1012, gaskets 1030, 1032, gaskets 190, 192, wafer 102 and alignment ring 130 form a wafer assembly 1080. Note that in some embodiments, the wafer assembly does not include alignment ring 130.

Because each of the adapters described above allow a wafer to be installed between fittings that have sealing surfaces that do not mate with the sealing surfaces of the wafer, each adapter can be considered to be a wafer-to-fitting sealing adapter. Further, in each of the embodiments above, the wafer has a sealing surface of a first type and the fitting has a sealing surface of a second type. In addition, in each embodiment above, an adapter is provided that has a first side that mates with the sealing surface of the first type and a second side that mates with the sealing surface of the second type. In FIGS. 1-6, the sealing surface of the second type is a ring type joint sealing surface. In FIG. 7, the sealing surface of the second type is groove sealing surface. In FIG. 8, the sealing surface of the second type is a tongue sealing surface. In FIG. 9 the sealing surface of the second type is female sealing surface. In FIG. 10, the sealing surface of the second type is a male sealing surface.

Although the adapters above are described as being used with a wafer, their use is not limited to wafers. Instead, the adapters may be used with any device that is constructed to mate with raised face flanges so that the device may be installed between other types of flanges such as ring type joint flanges.

Although the embodiments have been described above with identical sealing surfaces on the fittings of any one embodiments, those skilled in the art will recognize that further embodiments may be practiced where a wafer is placed between fittings that have different sealing surfaces from each other. For example, one fitting may have a female sealing surface while the other fitting has a ring type joint sealing surface. In such embodiments, adapters with different sealing faces are used on the opposing sides of the wafer disc and are selected such that the surface of the adapter facing the fitting will mate with the sealing surface of the fitting.

What is claimed is:

1. An industrial process assembly for carrying a process fluid conveyed through process piping comprising:

a wafer having a planar sealing surface and a bore for carrying the process fluid;

a fitting attached to process piping and having a sealing surface comprising at least one of an integral protrusion and a channel;

an adapter having a first sealing surface for mating with the planar sealing surface of the wafer and a second sealing surface for mating with the sealing surface of the fitting, the adapter positioned between the wafer and the fitting;

a gasket positioned between the adapter and the wafer;

wherein the sealing surface of the fitting comprises the channel in the form of an annular channel;

wherein the first sealing surface of the adapter comprises a planar surface and the second sealing surface of the adapter comprises an annular protrusion;

wherein the annular protrusion is positioned within and directly contacts the annular channel of the fitting;

wherein the annular protrusion is deformed by the annular channel of the fitting; and wherein the gasket comprises a sealing portion and a seating portion, wherein the seating portion positions the adapter on the wafer so that an inner bore of the adapter is aligned with the bore of the wafer.

2. A wafer assembly for insertion in process piping conveying a process fluid comprising:

a wafer ring having a first annular planar sealing surface on a first side, a second annular planar sealing surface on a second side opposite the first side and a bore for conveying process fluid;

a sealing adapter having a planar sealing surface on a first side facing the first side of the wafer ring and a non-planar sealing surface on a second side; and a gasket having a seating portion and a sealing portion wherein a first side of the seating portion extends around an outer circumference of the wafer ring and a second side of the seating portion extends around an outer circumference of the sealing adapter.

3. The wafer assembly of claim 2 wherein the wafer ring further comprises a radially extending hole.

4. The wafer assembly of claim 3 further comprising at least one fluid conduit in the radial hole.

5. The wafer assembly of claim 3 further comprising a mounting plate attached to the wafer.

6. The wafer assembly of claim 5 further comprising a transmitter attached to the mounting plate.

7. The wafer assembly of claim 2 wherein the non-planar sealing surface of the sealing adapter comprises an annular protrusion.

8. The wafer assembly of claim 7 wherein the sealing adapter, including the planar sealing surface and the annular protrusion, is constructed of a single piece of material.

* * * * *